(No Model.)
R. G. FERGUSON.
CHUCK FOR HOLDING PIPE NIPPLES.
No. 460,716.  Patented Oct. 6, 1891.
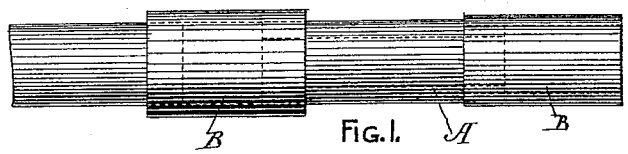
Fig. 1.
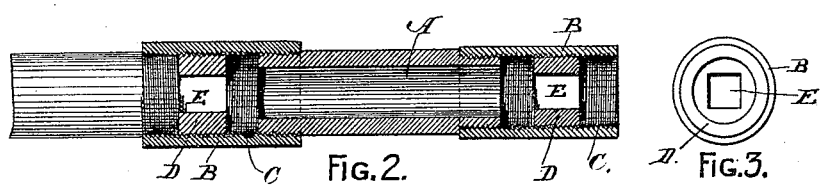 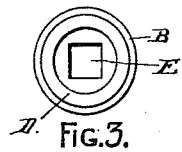
Fig. 2.  Fig. 3.
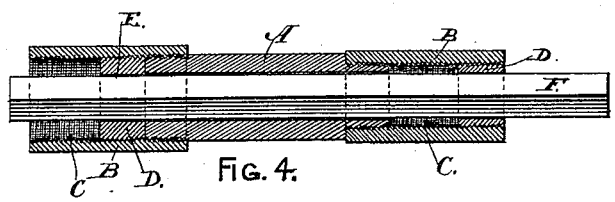
Fig. 4.
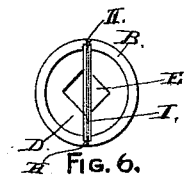
Fig. 5.  Fig. 6.
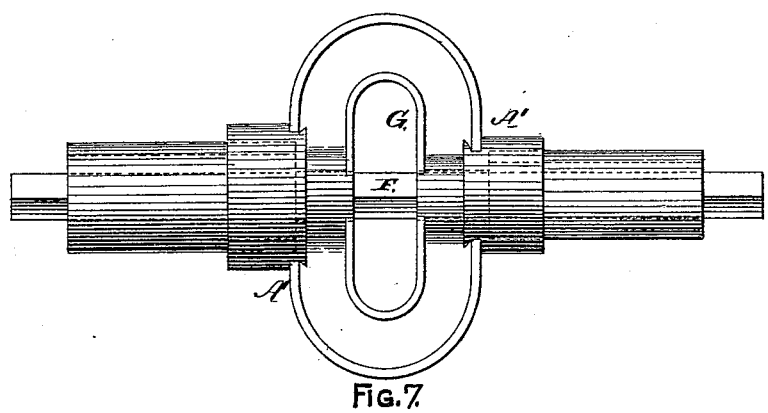
Fig. 7.
WITNESSES:
S. B. Brewer
H. V. Scattergood
INVENTOR:
ROBERT G. FERGUSON
BY William H. Low,
ATTORNEY.

UNITED STATES PATENT OFFICE.

ROBERT G. FERGUSON, OF LAKEWOOD, NEW JERSEY.

CHUCK FOR HOLDING PIPE-NIPPLES.

SPECIFICATION forming part of Letters Patent No. 460,716, dated October 6, 1891.

Application filed May 2, 1891. Serial No. 391,353. (No model.)

*To all whom it may concern:*

Be it known that I, ROBERT G. FERGUSON, of Lakewood, in the county of Ocean and State of New Jersey, have invented new and useful Improvements in Chucks for Holding Pipe-Nipples While Cutting Screw-Threads Thereon, of which the following is a specification.

My invention relates to improvements in chucks for holding short pieces of metallic pipe during the operation of cutting the final screw-threads thereon for the purpose of converting the same into pipe-nipples, said chuck being provided with means for holding nipples which have a right-hand screw-thread cut on one end thereof during the operation of cutting a left-hand thread on the opposite end.

The object of my invention is to provide an efficient chuck for holding short pipe-nipples which have had a screw-thread previously cut on one end of the same during the operation of cutting the required screw-thread on the opposite end. This object I attain by the mechanism illustrated in the accompanying drawings, which are herein referred to and form part of this specification, and in which—

Figure 1 is a side elevation of the preferred form of my chuck, showing a piece of pipe held therein for the purpose of converting said pipe into a nipple. Fig. 2 is a longitudinal section of said chuck with the piece of pipe shown in elevation. Fig. 3 is an end elevation of Fig. 1. Fig. 4 is a longitudinal section of the chuck shown in Fig. 1, without the piece of pipe shown in the last-named figure, but showing the rod or bar for manipulating the check-blocks of said chuck. Fig. 5 is a longitudinal section of my chuck provided with a retentive device for holding nipples which require differently-inclined screw-threads at their opposite ends. Fig. 6 is an end elevation of Fig. 5, and Fig. 7 is a side elevation of a modified form of my chuck.

As represented in the drawings, A designates the body of my chuck, which, as shown in Figs. 1, 2, 4, and 5, is made tubular in form and has at each extremity a tubular extension B, whose bore is provided with a screw-thread C, fitted to receive a threaded end of pipes whose external diameter corresponds to and is provided with an external screw-thread, which will screw into the threaded portion C of the bore of said extensions. The caliber of the extensions at the opposite ends of the body A is preferably made of a different size, so as to suit different diameters of pipes, and thereby each chuck can be adapted to making nipples of different diameters. Each extension B is provided with a check-block D, which has on its periphery a screw-thread that corresponds to the screw-thread C, formed in said extension, and each of said check-blocks is provided with a central opening E, which is preferably made quadrangular, but may be of any suitable form, for the purpose of receiving a rod or bar F of corresponding form that will fit said opening for effecting a rotary motion of said check-block for screwing the latter into and out of the chuck during the operation of adjusting the chuck to suit the length of the thread on the pipe, which thread has been previously cut on the pipe preparatory to making it into nipples. Said check-block, by being screwed snugly against the inner end of the pipe or nipple, prevents the latter from being turned in the chuck during the operation of cutting the final screw-thread on the protruding end of said pipe or nipple.

In the modification of my invention (shown in Fig. 7) the body A', instead of being entirely tubular, as shown in Figs. 1, 2, 4, and 5, is provided with an open loop G at or near its middle for the purpose of affording access to the bar F, near the middle of the chuck, so as to apply a wrench to said bar without necessitating the application of the wrench to a protruding end of said bar. This provision is most valuable when the retentive device, hereinafter described, is required to be used in the operation of cutting a final left-hand thread on a nipple whose opposite end is provided with a right-hand thread previously cut thereon.

For the purpose of cutting a left-hand thread on a nipple whose opposite end is secured in the chuck by means of a right-hand thread cut thereon, it is necessary that some provision should be made to prevent the nipple from being rotated in a direction that will tend to unscrew it from the chuck, and as a simple means for effecting that purpose opppositely-located longitudinal grooves H are formed in each extension B, and into said grooves a retentive device I is fitted to engage, as shown in Figs. 5 and 6. Said retentive device consists of a flat plate of tempered metal, whose outer end is pointed and has a knife-edge formed thereon. The pointed outer end of the retentive device is fitted to enter into the bore of the nipple or pipe, and its knife-edge will form scores or notches in the inner end of said nipple or pipe by forcing the check-block D against the inner end of the retentive device, and by maintaining said check-block forcibly against said retentive device the latter will be prevented from turning in the chuck in such manner as to become loosened therein. While held in this manner a left-hand screw-thread may be cut on the outer end of the nipple or pipe without danger of displacing the latter from the chuck.

My chuck is adapted to be used in connection with a screw-cutting machine or with a clamping device used when the screw-threads are cut by hand-dies.

My chuck is operated in the following manner: While the check-block is screwed back into the extension B to a sufficient distance, a piece of pipe having a screw-thread previously cut on the end to be inserted in the chuck is screwed into the latter to a required distance, and a check-block D is screwed up forcibly against the inner end of said pipe by means of the bar F, which passes through the opening E in said check-block, and to which a wrench should be applied for the purpose of turning the check-block with sufficient force to screw the latter snugly against the inner end of the pipe. By this means the pipe will be firmly secured in the chuck and held while a screw-thread is being cut upon the protruding portion of the pipe.

What I claim as my invention, and desire to secure by Letters Patent, is—

1. A nipple-chuck comprising a body-piece containing a longitudinal opening, which extends to the opposite ends of said body-piece, a tubular extension of said body-piece provided with an internal screw-thread, and a cylindrical check-block whose periphery is provided with a screw-thread fitted to engage in the screw-thread of said extension, said check-block being provided with a suitable opening for receiving a bar or wrench, whereby said check-block can be rotated for the purpose of screwing the latter inwardly and outwardly in said extension, substantially as herein specified.

2. A nipple-chuck comprising a body-piece containing a longitudinal opening, which extends to the opposite ends of said body-piece, the latter being provided with an open loop arranged transversely of the center line of said body-piece, a tubular extension of said body-piece provided with an internal screw-thread, and a cylindrical check-block whose periphery is provided with a screw-thread fitted to engage in the screw-thread of said extension, said check-block being provided with a suitable opening for receiving a bar or other appliance for rotating said check-block, as and for the purpose herein specified.

3. A nipple-chuck comprising a body-piece provided with a tubular extension having an internal screw-thread, said extension having oppositely-located grooves formed in its bore, a cylindrical check-block whose periphery is provided with a screw-thread which is the counterpart of the screw-thread in the tubular extension, and a retentive device fitted to enter into the grooves of said tubular extension and provided with means for engaging with a nipple, so as to prevent any rotative movement of the latter, substantially as herein specified.

ROBERT G. FERGUSON.

Witnesses:
CLARENCE MCKELVY,
W. J. HARRISON.